United States Patent [19]

Reilly et al.

[11] Patent Number: 4,769,225

[45] Date of Patent: Sep. 6, 1988

[54] SYSTEM FOR EXCHANGE OF HYDROGEN BETWEEN LIQUID AND SOLID PHASES

[75] Inventors: James J. Reilly, Bellport; Edward W. Grohse, Port Jefferson Station; John R. Johnson, Calverton, all of N.Y.; Warren E. Winsche, deceased, late of Bellport, N.Y., by Mary Ann Winsche

[73] Assignee: The United States of America as represented by the United States Department of Energy, Washington, D.C.

[21] Appl. No.: 704,113

[22] Filed: Feb. 22, 1985

Related U.S. Application Data

[63] Continuation-in-part of Ser. No. 559,558, Dec. 8, 1983, abandoned.

[51] Int. Cl.⁴ .............................................. C01B 3/50
[52] U.S. Cl. .................................... 423/248; 423/644; 423/648.1; 420/900
[58] Field of Search .................. 423/644, 648 R, 248; 420/900

[56] References Cited

U.S. PATENT DOCUMENTS 4,360,505 11/1982 Sheridan et al. ................... 423/248

FOREIGN PATENT DOCUMENTS 0094136 11/1983 European Pat. Off. ............ 423/248

Primary Examiner—Robert L. Stoll
Attorney, Agent, or Firm—Margaret C. Bogosian; James W. Weinberger; Judson R. Hightower

[57] ABSTRACT

The reversible reaction $M + x/2\ H_2 \leftrightarrow MH_x$, wherein M is a reversible metal hydride former that forms a hydride $MH_x$ in the presence of $H_2$, generally used to store and recall $H_2$, is found to proceed under an inert liquid, thereby reducing contamination, providing better temperature control, providing in situ mobility of the reactants, and increasing flexibility in process design. Thus, a slurry of particles of a metal hydride former with an inert solvent is subjected to a temperature and pressure controlled atmosphere containing $H_2$, to store hydrogen and to release previously stored hydrogen. The direction of the flow of the $H_2$ through the liquid is dependent upon the $H_2$ pressure in the gas phase at a given temperature. When the actual $H_2$ pressure is above the equilibrium absorption pressure of the respective hydride the reaction proceeds to the right, i.e., the metal hydride is formed and hydrogen is stored in the solid particles. When the actual pressure in the gas phase is below the equilibrium dissociation pressure of the respective hydride the reaction proceeds to the left, the metal hydride is decomposed and hydrogen is released into the gas phase.

10 Claims, 2 Drawing Sheets

COMPOSITION vs TIME, LaNi$_5$/UNDECANE SUSPENSION
A: SORPTION, 288 K, INITIAL P=8.9 atm, FINAL P=7.7 atm
B: DESORPTION, 323 K, INITIAL P=0.05, FINAL P=0.66 atm

SYSTEM FOR EXCHANGE OF HYDROGEN BETWEEN LIQUID AND SOLID PHASES

BACKGROUND OF THE INVENTION

The United States Government has rights in this invention pursuant to Contract Number DE-AC02-76CH00016, between the United States Department of Energy and Associated Universities, Inc.

RELATED APPLICATIONS

The present application is a continuation-in-part application of co-pending application Ser. No. 559,558 filed Dec. 8, 1983, and now abandoned.

This invention relates to hydrogen storage systems and more particularly it relates to processes employing liquid suspensions of soild metal hydride formers which can reversibly absorb and desorb hydrogen.

BACKGROUND ART

Metal hydrides and their formers have been under study for some years as hydrogen absorbers. It should be understood that metal hydride compounds may be divided into three general categories: saline or ionic, metallic, and covalent. This classification is based on the predominant character of the hydrogen bond. In the ionic hydrides, the crystal lattice consists of metal cations and hydrogen anions. Such hydrides are formed by the direct reaction of hydrogen with the alkali and alkaline earth metals and magnesium. Hydrides of these metals are quite similar to their halide analogues both in structure and properties. With the exception of magnesium, the ionic hydrides are too stable to be considered attractive hydrogen storage media. The covalent hydrides are formed by Be and many of the B group metals of the periodic table. These hydrides can be solid, liquid or gaseous. None of the covalent hydrides can be formed by the direct and reversible reaction of the solid metal with hydrogen and none of these hydrides can be used as hydrogen storage media.

The metallic hydrides exhibit typical metallic properties having a metallic appearance and high thermal and electrical conductivities. They can be formed by the direct and reversible reaction of hydrogen with most of the transition metals (periodic table Groups IIIA to VIIIA), including the lanthanide and actinide series. It is this group of metal hydrides that are useful as hydrogen absorbers. Their large capacity for hydrogen storage coupled with their ready release of hydrogen at moderate temperatures and pressures and their ability to undergo many cycles of absorption and desorption with little decrease in capacity make them potentially useful in a variety of industrial applications, including hydrogen storage in energy conversion cycles, chemical heat pumps and compressors, hydrogen purification, and hydrogen isotope separation.

Two properties of metal hydrides have been found to present significant problems in the design of pressure vessels or reactors containing metal hydrides, usually in granular or powder form, in which the absorption and desorption of hydrogen is alternately carried out: (1) the tendency of the hydride particles to fragment during successive absorption-desorption cycles, resulting in the production of undesirable fine powders after only a few cycles, with appreciable changes in bed volume and (2) the appreciable heats of hydriding (absorption) and dehydriding (desorption).

In conventional gas-solid beds, the fragmentation property requires special designs to deal with the resulting settling and compaction and the consequent deformation and hydrogen flow distribution problems in the containment vessels. Also, in gas-solid beds, the large heats of hydriding and dehydriding require complicated facilities for the removal and addition of heat, respectively, and/or long absorption and desorption times in order to avoid excessive temperature gradients within the bed, with consequent imcomplete absorptions and desorptions and, thus, reduced sorbent utilization.

Typical reversible metal hydride systems of the prior art are dry bed systems such as set forth in U.S. Pat. No. 3,508,414—Apr. 28, 1970—R. H. Wiswall and J. J. Reilly. Such systems involve contact of hydrogen with an aggregate of metal hydride particles. Severe constraints have been imposed in overall system design with these systems becasue of parameters that seriously limit heat transfer, separation of gas and solids, volumetric changes from expansion and contraction, immobility of the beds, and poisoning of active surfaces by contaminants.

One remedy for these problems has been proposed by Rudman, et al., "Hydrogen Separation From Gas Mixtures Using LaNi$_5$ Pellets", *J. Less Common Metals*, 89, 437 (1983). In this approach, pelleted forms of a given hydride former in admixture with a metal are used in an attempt to provide a thermal ballast and to decrease fragmentation. However, the use of the pellets increases the cost and decreases the efficiency of the process while failing to deal significantly with the heat and fragmentation problems.

Metals and metal alloys known to form reversible hydrides for reversibly capturing hydrogen include titanium alloys as set forth in U.S. Pat. No. 4,075,312—Feb. 21, 1978—J. Tanaka, et al., and lanthanum alloys disclosed in U.S. Pat. No. 4,142,300—Mar. 6, 1979—D. M. Gruen, et al. Other alloys are available as shown in U.S. Pat. No. 4,200,623—Apr. 29, 1980—A. Muller, et al. Elemental metals known to form metal hydrides are described in "Metal Hydrides" by W. M. Mueller, J. P. Blackledge and G. G. Libowitz, Academic Press, N.Y. 1968.

The present invention overcomes the problems of the prior art processes by using a slurry of metal hydride particles suspended in an inert liquid or solvent. In a slurry reactor, particle fragmentation does not produce vessel deformation. Problems such as restricted access of hydrogen to particles due to compacting in gas-solid systems are eliminated in well-agitated gas-liquid-solid slurry systems. In addition, temperature gradients within slurry reactors become negligible compared to those in gas-solid systems.

BRIEF DESCRIPTION OF THE INVENTION

This invention deals with reversible metal and metal alloy hydrides. Many elemental metals and some metallic alloys form metal hydrides. A metal hydride former is any metal or alloy that is capable of reacting with hydrogen reversibly to form a metallic hydride. The reaction, in its simplest form, consists of bringing gaseous hydrogen in contact with the metal or metal alloy. This reaction can be represented as follows:

$$M + x/2 H_2 \longleftrightarrow MH_x$$

where M is the metal hydride former and X is the number of hydrogen atoms in the final hydride product.

This reaction is reversible. Its direction is determined by the pressure of the hydrogen gas, the temperature of the reaction, or a combination of both. If the reaction pressure is above a certain level, termed the equilibrium absorption pressure, the reaction proceeds in the direction to form the metal hydride; if the reaction pressure is below the equilibrium dissociation pressure, the hydrogen is desorbed or released and the metal hydride decomposes into the metal hydride former and gaseous hydrogen. Obviously, this equilibrium can be controlled by keeping the pressure constant and varying the temperature. As the temperature is lowered, the reaction goes to the hydride; as the temperature increases, the reaction goes in the desorption direction and release of $H_2$ occurs. A combination of temperture and pressure parameters may be used to control the direction and speed of the reaction. As used throughout this specification, the terms equilibrium desorption pressure and equilibrium dissociation pressure are equivalent.

By confining the above reaction between hydrogen and the metal hydride former under a chemically inert liquid in slurry suspension and contacting said slurry with hydrogen gas by stirring or otherwide agitating the slurry, the reaction sequence $x/2H_2$ (gas)$\longleftrightarrow x/2H_2$ (liquid)$+M$ (suspended)$\longleftrightarrow MH_x$ (suspended) results. As used herein, the term inert liquid means any liquid which does not chemically react either with $H_2$ or with the metal/metal hydride solid. The inert liquid will not deactivate the surface of the solid in relation to its catalytic capability to dissociate the $H_2$ molecule into atoms or to prevent recombination of said atoms into the $H_2$ molecule. As with most liquids, the inert liquid does have the capacity to dissolve measurable amounts of hydrogen.

Any reversible metal hydride former as defined above is suitable for use in this invention. Suitable metal hydride formers include vanadium, FeTi, $CaNi_5$ or other known metal hydride formers whether elemental metals, metal alloys or intermetallic material. Suitable intermetallic hydride formers include $LaNi_{4.5}Al_{.5}$, $LaNi_5$ and $TiFe_{.7}Mn_{.2}$. Equilibrium pressure-composition isotherms for $LaNi_{4.5}Al_{.5}$ and $LaNi_5$, when adjusted for the vapor pressure of the inert liquids used, were virtually identical to those published in *J. of Less-Common Metals*, 63, 193 (1979), and *Philips Research Rep.*, 25, 133 (1970). Such identity indicates that the presence of the liquid phase does not affect the thermodynamic equilibria between the external $H_2$ molecule and the H atom in the bulk solid so that in this sense also the liquid is considered inert.

DETAILED DESCRIPTION OF THE INVENTION

It has been discovered, contrary to what would have been predicted from prior experimental results, that reversible metal and metal alloy hydrides can be made to react with $H_2$ dissolved in an inert liquid, e.g. as a slurry of solid particles in a liquid. Examples of inert liquids that are useful in the practice of the present invention include fluorinated hydrocarbons, such as perfluorodecane, silicone based solvents, saturated organic liquids, such as undecane, "iso-octane", octane and cyclohexane, or mixtures of high boiling point hydrocarbons such as kerosene. It is also possible to use water as the inert liquid or solvent. Using water as the solvent has the added advantage that other materials that will enhance or catalyze the absorption of $H_2$ can also be dissolved in the solvent.

Due to the liquid-like properties of the present system, a number of advantages are obtained over prior art systems. The heat transfer coefficients and effective thermal conductivity of slurries are at least on an order of magnitude greater than prior art dry systems, thereby permitting a much larger range of gas flows, simpler heat exchanger design requirements, more facile temperature control and much greater design flexibility in systems applications and constructin. Further, serious construction problems associated with bed expansion (the solid expands and contracts about 20 volume % during each hydriding/dehydriding cycle due to density differences between the hydride and the metal) are eliminated. The gas/solid separation step is also simpler than the prior art dry systems. The slurry can also be pumped to resolve immobility problems associated with prior art systems. Clearly the problems heretofore associated with the prior art have been either eliminated or favorably modified by this discovery thus permitting a much wider range of system designs and uses.

Figure 1:
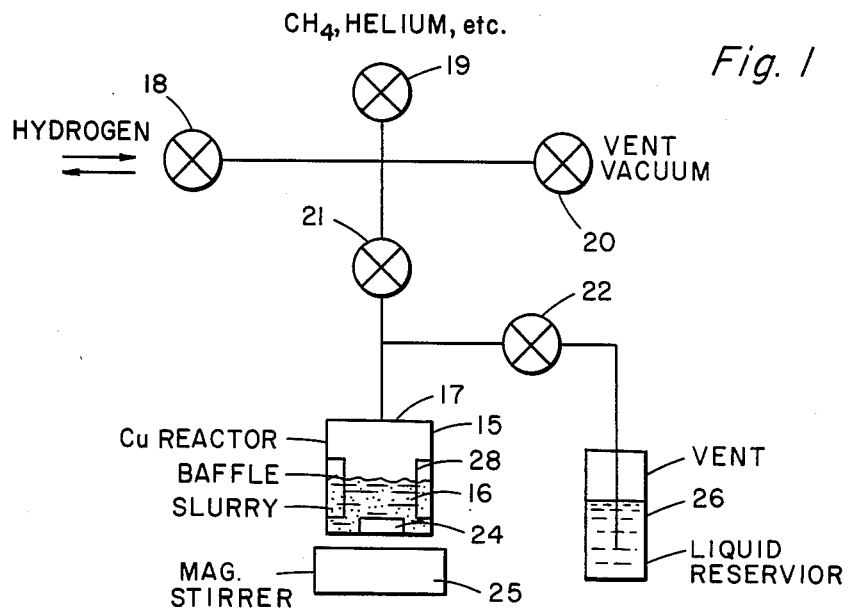
FIG. 1 is a schemtic system diagram of the type of equipment that may be used in carrying out the invention.

With reference to FIG. 1, a closed reactor vessel 15, constructed from any suitable metal, with copper being preferred if magnetic stirring elements are used, contains a slurry 16 or inert liquid and a reversible metal hydride former that reacts with hydrogen to form a hydride that will release hydrogen; whether the metal hydride former or metal hydride is present will depend upon the temperature and $H_2$ pressure in the $H_2$ containing atmosphere 17 above the slurry. The various valves 18 and 22 serve to close the vessel and may be opened to insert or extract the various reactant atmospheres and materials, as labelled in the drawing.

Typically, a hydrogen containing gas is inserted at valve 18, passes through valve 21 and is retained at a pressure above the equilibrium absorption pressure of the metal/metal hydride system in the vessel atmoshere region 17. The hydrogen may be introduced as pure $H_2$ gas or in mixture with other gases. The hydrogen may be mixed with saturated hydrocarbon gases or vapors, such as $CH_4$ and $C_2H_6$, helium, carbon monoxide, carbon dioxide and the like. Air could also be present in the gas stream. The ability to use a gas stream containing $H_2$ in admixture with other gases renders the process more useful because it eliminates the necessity and expense of using a pure $H_2$ gas stream. One significant application of this improvement of the present invention is that it may be possible to use the gas stream coming out of a refinery, which contains $H_2$ mixed with hydrocarbons, as the gas stream in the present process. It is too expensive to purify this stream to obtain pure hydrogen to use in a gas-solid system so that at present the refineries usually burn off this gas stream.

Another important aspect of the ability to use a mixed gas stream is that if the gas present with the $H_2$ is a low molecular weight material and is not present in significantly high concentrations so as to interfere with the $H_2$ dissolving in the solvent and making contact with the metal hydride former, then this gas acts to decrease the surface tension of the inert liquid solvent, which in turn decreases the activation energy needed for the uptake of hydrogen, resulting in an increase in the rate of hydrogen uptake in the solvent. The highter the concentration of the hydrogen in the solvent, the more efficient the absorption reaction will occur. This is a further significant improvement of the present invention over the prior art gas-solid systems. In such systems, the presence of even a small concentration of a hydrocarbon such as $CH_4$ greatly decreased the rate of hydrogen absorption.

The hydrogen can also be introduced into the reactor already dissolved in a liquid. The hydrogen gas or mixture of gases is first dissolved in a liquid, prefereably the same liquid used in the reactor, and then this liquid containing the dissolved hydrogen is cycled into the reactor. The reactor can contain the metal hydride former solid in slurry form suspended in an inert liquid. The reactor can alternatively contain the metal hydride former in the form of immobile compacts. In such a case, the metal hydride former remains immobile in the reactor and a flow of an inert liquid containing dissolved $H_2$ is maintained over the bed.

After the hydrogen is introduced into the reactor, it is separated from other residual gases and forms the hydride so that only hydrogen is stored in the slurried solids 16.

When the hydrogen is to be recovered the vessel atmosphere region 17 is vented to the surroundings through valve 20 until the pressure in the reactor is below the equilibrium dissociation pressure of the hydride. When this condition occurs, the hydride decomposes and releases hydrogen. The reactor temperature should be maintained at a value required to release $H_2$ at a given pressure and rate. Other forms of vessels could be used with flow through capablities provided that the temperature and pressure are manipulated as described. In particular, the slurry 16 may be pumped as a liquid between locations and can be cooled or heated to desired temperatures readily. Thus, maintenance of isothermal conditions is greatly facilitated and easier system control of the temperature is afforded, thereby making it easy to maintain special system operational conditions such as optimization of $H_2$ absorption or desorption rates. Most importantly, because of the vastly superior heat transfer and heat conductivity characteristics relative to dry bed systems, the removal or the addition of heat is no longer rate limiting as far as practical hydrogen storage applications are concerned.

The slurry can contain conventional hydrogenation catalysts that could accelerate the reaction between the meal hydride former and the dissolved hydrogen. Examples of such catalysts include Raney nickel and palladium black.

The hydrogen molecule is transported to the surfaces of the solid particles in the slurry to form the hydride. Magnetic stirring elements 24 and 25 or other agitating means efficiently provide for gas/liquid contact, homogeneous suspension of the solid metal particles, good heat transfer, high effective thermal conductivity, and facile transport of the dissolved $H_2$ molecule through the liquid phase.

A further advantage of forming the hydride under a liquid is that there is no direct surface contact between the suspended metal and the gas phase thus tending to protect the metal hydride former from poisoning by contaminants that may be present in the gas phase.

The following non-limiting examples are given by way of illustration only.

EXAMPLE 1

Figure 2:
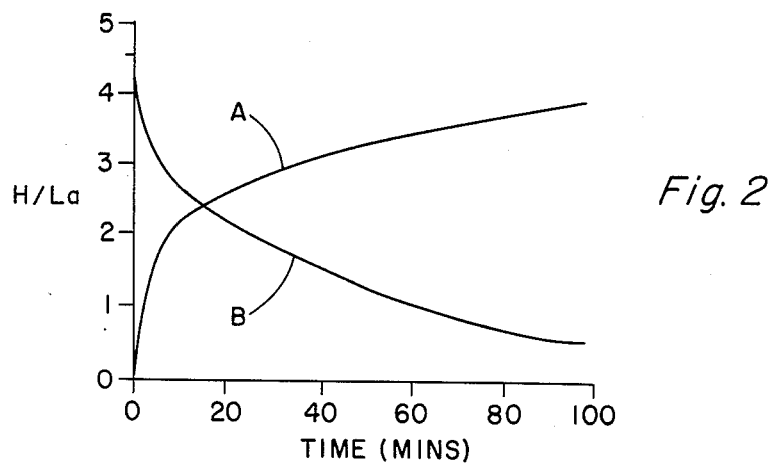
FIG. 2 is an isothermal graph showing the changes of hydrogen content with time under defined pressures and temperatures for a slurry of $LaNi_5$ in undecane.

Ten grams of a previously activated $LaNi_5$ alloy in particle form are introduced into reactor 15 and reactivated in situ. These particles were pre-activated by subjecting them to one cycle of hydriding and dehydriding to form a powder. Obviously, the pre-activation could be done in situ or outside of the reactor. This pre-activation results in expansion and contraction of the solid forming cracks in the particles and in increasing the particle surface area. A range of from 0.1 to 1 square meter of surface area per gram of solid is achieved after activation. Then, 35 ml of n-undecane is added from reservoir 26, through valve 22 and hydrogen is admitted through valve 18 up to a pressure of 10 atmospheres. Agitation is then begun. The temperature is kept constant and the absorption rate curve (A) as shown in FIG. 2 is developed under the specified conditions of temperature and pressure. The desorption rate curve (B) shown in FIG. 2 was developed under the conditions specified. This conforms with the reaction sequence $x/2 H_2$ (gas)$\longleftrightarrow x/2 H_2$ (liquid)$+M$ (suspended)$\longleftrightarrow MH_x$ (suspended) where the notation (liquid) refers to $H_2$ dissolved in the liquid as a result of agitation, pressure, etc.

EXAMPLE 2

The same procedures can be employed as set forth in Example 1 above using $LaNi_{4.5}Al_{.5}$ or $TiFe_{.7}Mn_{.2}$ as the metal hydride forming agent instead of $LaNi_5$.

EXAMPLE 3

A hydride former such as $LaNi_5$ that reversibly forms a hydride may be used in the form of immobile compacts in the vessel. Such compacts can be prepared, for example, as described by Ron, et al., "Preparation and Properties of Porous Metal Hydride Compacts", *J. of Less-Common Metals,* 74, 445–448 (1980). Over this bed is maintained a flow of an inert liquid containing dissolved $H_2$. The $H_2$ was dissolved in the liquid by contacting it with $H_2$ gas in a vessel separate from the vessel containing the $LaNi_5$ solids. Thus, dissolved hydrogen is carried by the flowing liquid into surface contact with the $LaNi_5$ particles to form the hydride provided that the pressure maintained in the gas phase in the vessel separate from the vessel containing the particle bed is above the equilibrium absorption pressure of $LaNi_5$. Conversely, hydrogen is released from the previously formed hydride and carried by the liquid phase to the gas/liquid contacting vessel and is evolved from the liquid when the $H_2$ pressure in the latter vessel is below the equilibrium dissociation pressure of the hydride.

EXAMPLE 4

Figure 3:
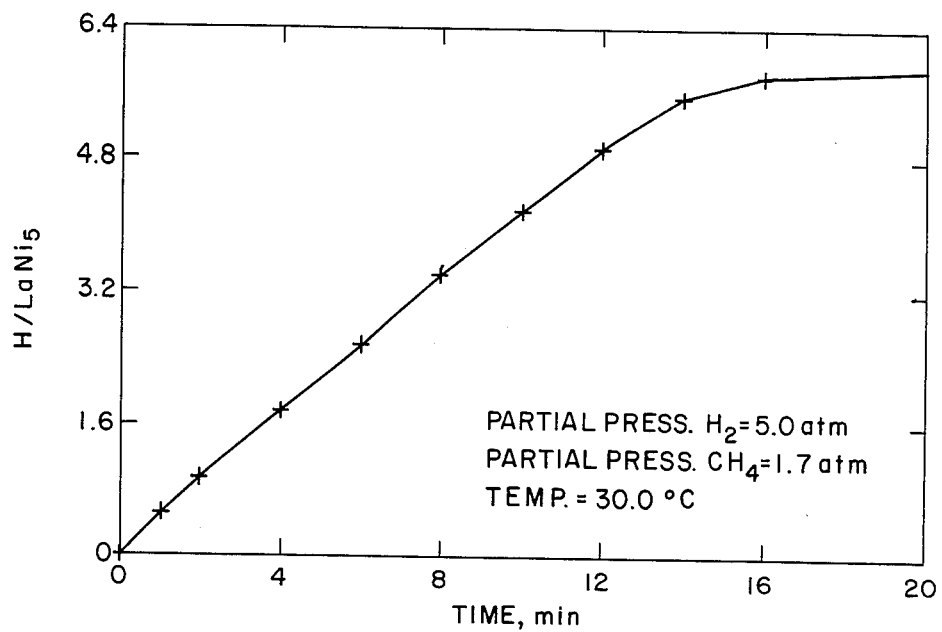
FIG. 3 shows the uptake rate curve for hydrogen using a partial pressure of $H_2$ of 5.0 atm. and a partial pressure of $CH_4$ of 1.7 atm. at 30° C.
Figure 4:
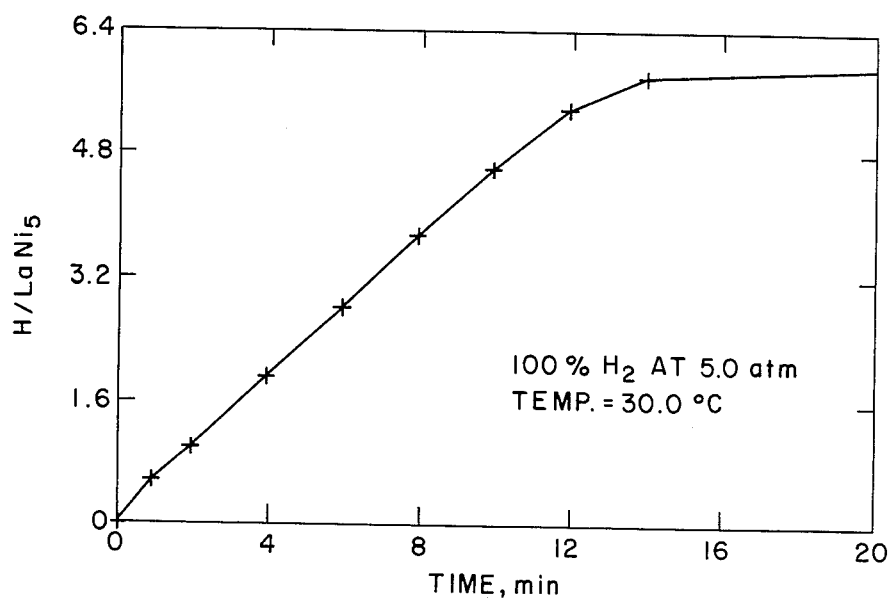
FIG. 4 shows the uptake rate curve for hydrogen using a pure $H_2$ gas stream at 5.0 atm. and 30° C.

Ten grams of a previously activated $LaNi_{4.7}Al_{.3}$ alloy were introduced into reactor 15 and reactivated in situ. Then 50 ml of n-undecane was added through valve 22 after which pure $CH_4$ was introduced through valves 19 and 21 until the pressure was 1.7 atm. Hydrogen was then admitted through valves 18 and 21 until the total pressure was 6.7 atm. Agitation was begun and the rate curve shown in FIG. 3 was developed under the specified conditions of temperature and pressure. There was no significant difference in the uptake rate of hydrogen in this experiment and a similar experiment performed in the absence of $CH_4$ (see FIG. 4).

EXAMPLE 5

Each of the following experiments was conducted to show the use of a gas stream containing hydrogen mixed with another gas or vapor. The slurry consisted of $LaNi_5$ solids in 50 ml. of n-undecane. The same procedures and reaction conditions described in EXAMPLE 4 were used in these experiments. $H_2$ and $CO_2$: Using a gas consisting of 25% $CO_2$/75% $H_2$, the hydrogen absorption rate was about ½ that of pure $H_2$ at the same partial pressure and reactor temperature.

Removal of the $CO_2/H_2$ mixture and exposure of the metal hydride former sample to pure $H_2$ resulted in $H_2$ absorption at the same rate as before $CO_2$ exposure. Therefore, there was no permanent adverse effect on sample activity.

$H_2$ and $C_2H_6$: Using a gas consisting of 25% $C_2H_6$/75% $H_2$, the hydrogen absorption rate was slightly faster than for pure $H_2$ under the same pressure and temperature conditions.

$H_2$ and $CH_4$: Using a gas consisting of 25% $CH_4$/75% $H_2$, the hydrogen absorption rate was the same as for pure $H_2$ at the same pressure and temperature.

EXAMPLE 6

The following experiments were conducted to show the use of a gas stream containing hydrogen mixed with a hydrocarbon gas or vapor. The slurry consisted of $LaNi_{4.7}Al_{0.3}$ in 50 ml of n-undecane. The same procedures and reaction conditions described in EXAMPLE 4 were used in these experiments.

$H_2$ and $CH_4$: Using a gas consisting of 41% $CH_4$/59% $H_2$, the $H_2$ uptake rate was approximately ¾ that for pure $H_2$ under the same pressure and temperature conditions.

Using a gas consisting of 25% $CH_4$/75% $H_2$, the $H_2$ absorption rate was the same as for pure $H_2$ at the same pressure and temperature.

This discovery having advanced and improved the state of the art, those features of novelty that are believed to represent the nature and spirit of the inventions are defined with particularity in claims.

We claim:

1. The process of selectively storing and releasing hydrogen in metal hydride formers that reversibly react with hydrogen to form hydrides and release hydrogen, comprising in combination the steps of:
   (a) suspending particles of a metal hydride former that can reversibly absorb and desorb hydrogen in an inert liquid selected from the group consisting of silicone base liquids, saturated organic liquids which may be florinated, kerosene, and water, to form a slurry;
   (b) agitating said slurry in the presence of hydrogen gas at a pressure above the equlibrium absorption pressure of said metal hydride former so that said metal hydride former absorbs said hydrogen to form the metal hydride and establish the $H_2$ storage mode of operation of said process; and
   (c) agitating said slurry, containing the previously formed metal hydride, in the presence of hydrogen gas at a pressure below the equilibrium desorption pressure of the metal hydride to decompose the metal hydride into $H_2$ gas and the metal hydride former.

2. The process of claim 1, wherein the metal hydride former is selected from the group consisting of $LaNi_5$, $LaNi_{4.5}Al_{.5}$, $LaNi_{4.7}Al_{.3}$, and $TiFe_{.7}Mn_{.2}$.

3. The process of claim 1, wherein said saturated organic liquid which may be fluorinated is selected from the group consisting of undecane, "iso-octane", octane, cyclohexane and perfluorodecane.

4. The process of selectively storing and releasing hydrogen in metal hydride formers that reversibly react with hydrogen to form hydrides and release hydrogen, comprising in combination the steps of:
   (a) suspending particles of a reversible metal hydride former in an inert liquid selected from the group consisting of silicone based liquids, saturated organic liquids which may be fluorinated, kerosene and water to form a slurry, agitating and subjecting the slurry to a constant pressure of hydrogen and lowering the temperature of the slurry to a point where the equilibrium absorption pressure of said metal hydride former is below the actual hydrogen pressure in the system so that said metal hydride former absorbs and stores hydrogen; and
   (b) agitating said slurry containing the previously formed metal hydride while increasing the temperature, maintaining the hydrogen gas pressure at a constant value by discharging hydrogen gas, to the point where the equilibrium desorption pressure is above the actual hydrogen pressure of the system so that the metal hydride decomposes in $H_2$ gas and the metal hydride former.

5. The process of claim 4, wherein the metal hydride former is selected from the group consisting of $LaNi_5$, $LaNi_{4.5}Al_{.5}$, $LaNi_{4.7}Al_{.3}$ and $TiFe_{.7}Mn_{.2}$.

6. The process of claim 4, wherein said saturated organic liquid which may be fluorinated is selected from the group consisting of undecane, "iso-octane", octane, cyclohexane, and perfluorodecane.

7. The process of claim 1, wherein the temperature is varied as well as the pressure in order to effect the most optimum conditions for either absorbing or desorbing hydrogen.

8. The process of claim 4, wherein the pressure is varied as well as the temperature in order to effect the most optimum conditions for either absorbing or desorbing hydrogen.

9. A process for exchanging hydrogen between an inert liquid selected from the group consisting of silicone based liquids, saturated organic liquids which may be fluorinated, kerosene, and water and an immobile compact of a metal hydride former capable of reversibly absorbing and desorbing hydrogen comprising contacting the liquid phase with hydrogen gas in a vessel separate from that containing said immobile compact, flowing the liquid through the immobile compact to effect the exchange of hydrogen, with the direction of the exchange depending at any given temperature on the pressure of the hydrogen in the gas phase.

10. A process for selectively absorbing hydrogen from gas mixtures containing $H_2$ and gaseous components from the group consisting of light molecular weight hydrocarbons, $CO_2$ and $H_2O$ comprising:
    (a) suspending in a reactor particles of a metal hydride former, which will reversibly react with hydrogen to absorb or desorb hydrogen, in an inert liquid selected from the group consisting of silicone based liquids, saturated organic liquids which may be fluorinated, kerosene, and water to form a slurry;

(b) agitating and said slurry in the present of the gas mixture containing hydrogen gas at a pressure above the equilibrium absorption pressure of the metal hydride former to form the metal hydride by the absorption of hydrogen by the metal hydride former;

(c) removing the gaseous atmosphere remaining in the reactor to eliminate the other gaseous components; and (d) agitating said slurry containing the previously formed metal hydride in the presence of hydrogen gas at a pressure below the equilibrium desorption pressure of the metal hydride to cause the metal hydride to decompose into $H_2$ gas and the metal hydride former.

* * * * *